June 7, 1955 R. HOTTEL 2,710,213
CAM-ACTUATED LATCH
Filed July 25, 1952
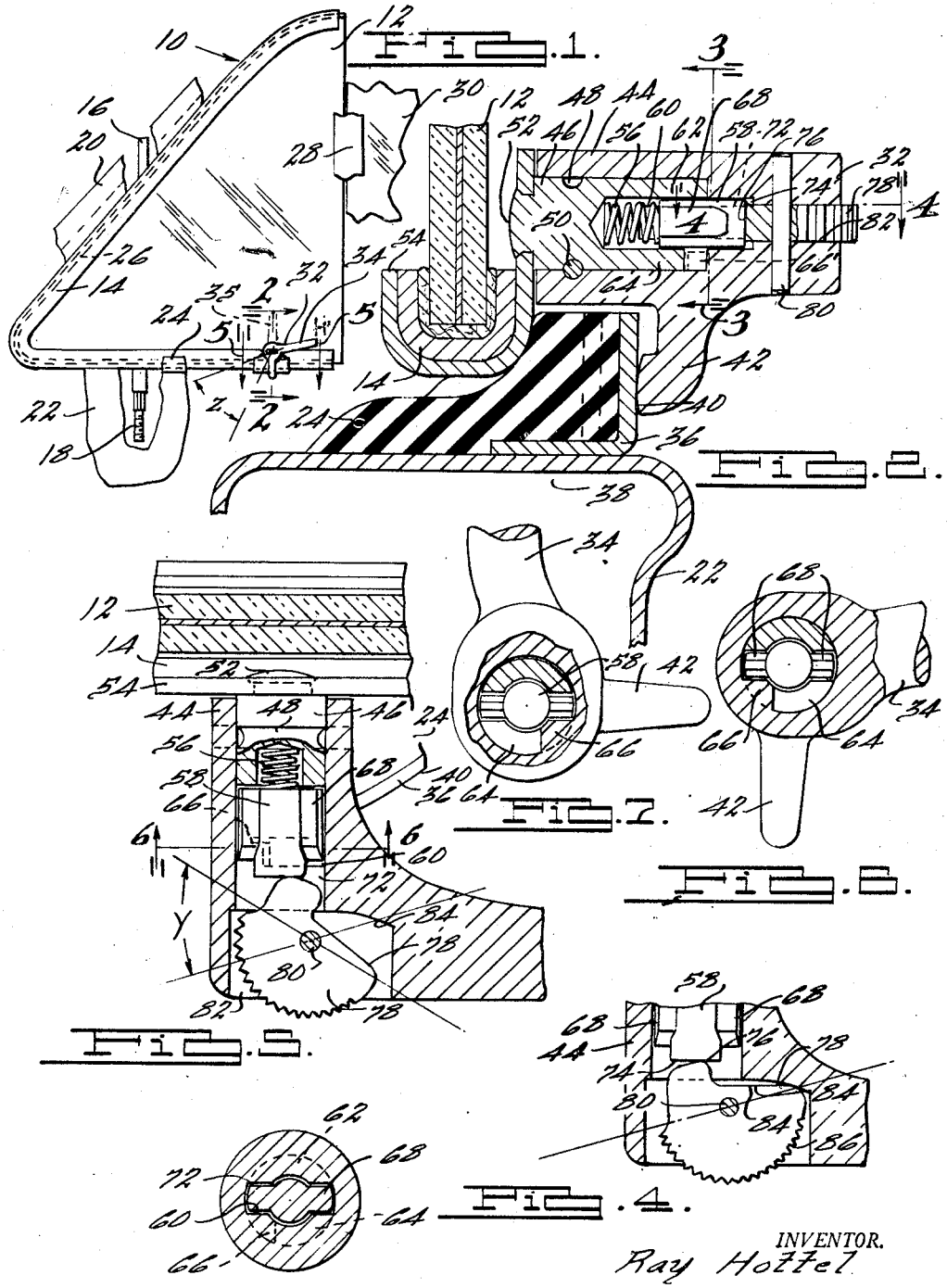
INVENTOR.
Ray Hottel
BY
Harness and Harris
ATTORNEYS

United States Patent Office 2,710,213
Patented June 7, 1955

2,710,213

CAM-ACTUATED LATCH

Ray Hottel, Detroit, Mich., assignor to Chrysler Corporation, Highland Park, Mich., a corporation of Delaware Application July 25, 1952, Serial No. 300,891

1 Claim. (Cl. 292—207)

The present invention relates to operating and latching structure for a ventilating device, particularly to a latch for the pivoted vent wing of a vehicle body.

The invention is concerned principally with an arrangement where the swinging wing is, as contrasted with crank-and-linkage-operated mechanisms, operated by the direct application of forces. To this end, a handle is pivotally mounted on the glass panel or on the trim molding confining the edges of the panel and by means of this handle the wing panel is swung opened or closed. When the wing panel is in closed position, the handle is turned on its pivot such that a portion thereof moves transversely beyond an adjacent structural element to lock the panel closed. The panel is usually of triangular shape and engaged by a deformable rubber seal on at least two of the three full sides thereof. In this connection, an inclined plane or what may be termed a cam, cooperates with a cam toe on the handle so that as the handle is turned to lock the wing closed, the wing is tightened into sealed engagement with the deformable rubber by the action of the toe over the inclined plane or cam. One difficulty in an arrangement of the kind as thus far broadly described, is that the structure affords relatively easy access to the interior of the vehicle. A common avenue for such access is the readily deformable rubber seal around the swingable vent wing. A looped wire or the like may be passed into the vehicle either through a convenient slot or body opening already existing or else by means of distorting the deformable rubber out of the way, whereupon the loop or a hook on the end of the wire may be used to engage and turn the latch handle so as to unlock the swinging vent wing.

One object of this invention is to provide an improved latching arrangement for a vehicle vent wing which is relatively difficult to operate by means of wires and the like jimmying tools from without the vehicle. This latching arrangement is such that it may be readily engaged to be unlatched by the fingers or hand of the operator when the operator reaches a natural position for turning the handle. At the same time the actuator of the latching arrangement is arranged and partially concealed such that it is not readily susceptible to operation by some instrument or length of wire which is passed into the vehicle from the outside.

Another object is to provide a latch structure susceptive to simple manufacture and easy fabrication of parts.

Still another object is to produce latch means operable by relatively little manual effort.

Another object is to provide an operable latching structure which is relatively free from requirements of adjustment and replacement of parts.

Other features, objects and advantages will either be specifically pointed out or become apparent when for a better understanding of the invention, reference is made to the following written description taken in conjunction with the accompanying drawings in which:

Figure 1 is a view of a latched vent wing assembly incorporating the present invention;

Figure 2 is a sectional view along the lines 2—2 in Figure 1;

Figures 3 and 4 are respective elevational and plan views along section lines 3—3 and 4—4 in Figure 2;

Figure 5 is a longitudinal section along lines 5—5 in Figure 1;

Figure 6 is an elevational view along the lines 6—6 in Figure 5; and

Figure 7 is a view similar to Figure 6 but showing the latch in a different position of rotation.

In Figure 1, a vent wing assembly 10 comprises a substantially triangular glass 12 which is received on two sides by a reversely bent channel 14. An upper mounting pivot 16 is affixed to one portion of the channel 14 and a lower pivot 18 is affixed to the lower portion of the channel 14. The vent wing assembly 10 fits in a reveal formed in a front vehicle door and is bounded by a garnish moulding portion 20 for the door which is complementary to a windshield pillar, not shown, and a garnish molding portion 22 which is incorporated in the main door structure. A deformable rubber seal for the vent wing assembly has a first portion 26 supported by the garnish molding portion 20 and a second portion 24 supported by the garnish molding portion 22. The seal portions 24, 26 are disposed both within and without of the vent wing assembmly depending upon which side of the axis of the pivots 16, 18 the rubber seal is located. A straight piece of channel 28 receives a vertically slidable window pane 30 and provides the rear portion of the reveal for the vent wing assembly 10. The channel 28 may be fixed relative to the door structure in which case it serves as a fixed mullion but may also be slidable with the glass pane 30 in a vertical direction relative to the door structure. A latch 32 is provided adjacent the bottom portion of the channel 14 and is manually operated by means of a handle 34 from the full line position shown in Figure 1 into the dotted line position shown at 35.

In Figures 2, 3, and 4, a cam 36 constituting a latch plate is provided adjacent the deformable rubber seal 24 and is secured by means of one or more rivets 38 to the garnish molding portion 22 incorporated in the vehicle door. The cam 36 has a surface which is disposed along an inclined plane and which presents a camming surface 40. A cam toe 42 cooperates with the camming surface 40 to compress and seal the channel 14 against the deformable rubber seal 24. The toe 42 forms a portion of the latch 32 and is affixed to a sleeve body or barrel portion 44 thereof. The barrel portion 44 telescopes over a fixed stud 46 containing a peripheral groove 48 in which a lock rod carried by the barrel 44 is slidably received. The barrel 44 thus is pivotally held to the stud 46 and prevented from separating axially therefrom. The stud 46 has a solid inner end which is peened over at 52 so as to be affixed to a bracket 54 which is firmly secured to the channel 14 supporting the vent wing glass 12. The outer end of the stud 46 is hollow and cooperates with the enveloping barrel portion 44 to define a chamber in which there is contained a yieldable member 56 in the form of a coil spring. A plunger 58 is slidably received within the chamber just named, and is subjected to the yieldable thrust of the spring 56. The hollow outer end of the stud 46 is provided with two diametrically opposed longitudinal slots 60 which provide two terminal portions 62, 64, the latter of which is relieved at the end so as to be shorter than the other portion 62 and to provide clearance for the swingable movement of a sector-shaped lug which is phantomed in at 66' in Figure 2 and is internally carried by the latch barrel portion 44. The true position of the sector-shaped lug is better shown at 66 in Figure 3. At one end, the plunger 58 has a set of laterally extending keys 68, preferably two in number, which are beveled at one side and affixed to the plunger. The keys 68 are slidably received in the stud slots 60 and are also slidably received in a registering slot 72 formed in the barrel member 44 adjacent to but axially outward of the sector-shaped lug 66. The bevel-shaped side of the keys 68 is disengageably slidably received in the slot 72. The opposite end of the plunger 58 presents a cam follower surface 74 which is at all times engaged by a cam nose 76 formed on a cam element 78. The cam element 78 swings on a pivot 80 supported by the barrel portion 44 and is engaged in one extreme position by a stop 84 marking the limits of another slot 82 formed in the barrel 44 and communicating with the previously noted barrel slot 72. The cam element 78 has a substantially semi-circular portion 86 which is serrated to provide a roughened surface for the manual operation by the operator of the cam element 78.

The operation of the latch 32 thus far described is illustrated in Figures 5–7. In Figure 5 it will be noted that the cam element 78 may be rotated on the pivot 80 in a clockwise fashion to the extent illustrated by the angle Y in which case the plunger 58 will be depressed due to cam action from the position of the foregoing Figures 2, 4 to the relatively depressed position of Figures 5, 6. Thereupon the handle 34 may be manually operated from the position of Figure 6 corresponding to the solid line showing in Figure 1, to the position of Figure 7 corresponding to the dotted line position 35 in Figure 1. Thus in Figure 1 the handle 34 and the latch 32 may be rotated to the extent illustrated by the angle Z. Conversely when the latch handle is moved from the dotted line position shown by the dotted line 35 in Figure 1 to the solid line position 34, the plunger keys 68 and the barrel slot 72 are caused to be brought into registry whereupon the spring 56 forces the plunger 58 and the keys 68 into locked position. In the sequential Figures 6 and 7 corresponding to the cam-actuated position of the plunger 58 according to Figure 5, it will be noted that the sector-shaped lug 66 moves within the area of relief provided by the shorter terminal portion 64 of the stud 46, and engages one of the keys 68 at one limit of travel, and the other of the keys 68 at the opposite limit of travel. At such time it will be understood that the beveled sides of the keys 58 are completely free of the barrel slot 72 and engage only the slots 60 formed in the stud 46 with which they are at all times non-rotatable.

As herein disclosed, the invention is shown applied to a front vent wing bounded by a reveal including a door part which is complemental to a windshield pillar. It is evident that the invention is equally adaptable to a rear vent wing which is bounded by a reveal including a door part complementary to a rear quarter panel or other rear body pillar in the car. So also the drawing discloses a handle-operated, channel-mounted latch cooperating with a camming surface presented by the lower garnish molding portion 22 of a vehicle door construction, but self-evidently the latch may be re-located with respect to the channel 14 so as to cooperate with a camming surface presented by a fixed vertical mullion in the door or by a vertically disposed channel member which moves with a vertically slidable pane adjacent to the triangular-shaped vent wing. There is a set of serrations shown applied to the operator-operated cam element 78 for the purpose of giving a semi-circular roughened surface 86 for ease in actuating the cam element, but indeed, a roughness due to serrations is not essential to the invention and a semi-circular actuating portion which is either roughened by other means or else entirely smooth is broadly contemplated.

Variations within the spirit and scope of the invention described are equally comprehended by the foregoing description.

What is claimed is:

For use with a vent wing swingably mounted in a reveal presenting a camming surface, a stud having a solid end affixed to the vent wing and a hollow end having longitudinal slots providing key seats, a depressible plunger mounted in said stud, a set of keys formed on said plunger and continually guided in said slots, a cam follower surface formed on said plunger at one end thereof, a yieldable member in the hollow end of the stud acting between the latter and the plunger to restore the plunger to an outer position whenever depressed, a barrel member surrounding the plunger on all sides so as to leave no part thereof protruding, said barrel member fitting over the hollow end of the stud and pivotally secured to the stud, said barrel member being rotatable and having an internal lug engaging the keys to limit rotation of the barrel member, relatively inner and outer slot means formed in the barrel, said slots communicating with one another, a cam toe, a plunger actuating cam element, said cam toe forming a portion of said cam element, said cam element being pivoted within a portion of said barrel, an exposed operator-operated portion of said cam element being received within said outer slot means, said cam element being operable upon rotation thereof to depress said plunger from its outer position by camming said cam toe over said plunger cam follower surface, said inner slot means receiving said keys to prevent barrel rotation at a time when said plunger is in said outer position, said inner slot being vacated by said keys to permit barrel rotation when said cam element is operated to overcome said yieldable member and depress the plunger, the exposed operator-operated portion of said cam element substantially comprising a segment of a disc, a substantially circular peripheral edge formed on said disc, a portion of said peripheral edge protruding from said outer slot means to facilitate rotation of said cam element by the vehicle operator, and a handle formed on said barrel member and extending substantially transversely therefrom, said handle facilitating rotation of said barrel, the protruding peripheral edge portion of said disc being the only portion of said cam element extending to the exterior of said barrel member.

References Cited in the file of this patent

UNITED STATES PATENTS

| | | |
|---|---|---|
| 2,259,136 | Hogg | Oct. 14, 1941 |
| 2,461,329 | Landwehr | Feb. 8, 1949 |
| 2,461,330 | Landwehr | Feb. 8, 1949 |
| 2,603,515 | Thomas | July 15, 1952 |